United States Patent
Albert et al.

[11] Patent Number: 6,020,782
[45] Date of Patent: *Feb. 1, 2000

[54] NOISE ASSISTED SIGNAL PROCESSOR WITH NONLINEARLY COUPLED ARRAYS OF NONLINEAR DYNAMIC ELEMENTS

[75] Inventors: Terence R. Albert; Adi R. Bulsara; Gabor Schmera; Mario Inchiosa, all of San Diego, Calif.

[73] Assignee: The United States of America as represented by the Secretary of the Navy, Washington, D.C.

[*] Notice: This patent is subject to a terminal disclaimer.

[21] Appl. No.: 08/893,907

[22] Filed: Jul. 11, 1997

Related U.S. Application Data

[63] Continuation of application No. 08/662,811, Jun. 12, 1996, abandoned, which is a continuation of application No. 08/249,111, May 25, 1994, abandoned.

[51] Int. Cl.$^7$ .................................................. H03K 5/00
[52] U.S. Cl. ......................... 327/552; 327/361; 327/363; 331/1 A
[58] Field of Search ................................... 327/551, 552, 327/553, 554, 555, 556, 355, 361, 363; 331/1 A, 57

[56] References Cited

U.S. PATENT DOCUMENTS

| | | | |
|---|---|---|---|
| 3,786,341 | 1/1974 | Anderson et al. | 324/311 |
| 3,824,451 | 7/1974 | Freeman et al. | 324/312 |
| 3,833,797 | 9/1974 | Grobman et al. | 364/574 |
| 3,882,444 | 5/1975 | Robertson | 367/92 |
| 3,916,340 | 10/1975 | Scott | 331/107 S |
| 4,025,730 | 5/1977 | Sawai | 364/724.08 |
| 4,040,728 | 8/1977 | Seidel | 331/55 |
| 4,068,228 | 1/1978 | Vallas | 341/109 |
| 4,254,662 | 3/1981 | Kuroda et al. | 73/626 |
| 4,658,426 | 4/1987 | Chabries et al. | 381/94 |
| 4,719,466 | 1/1988 | Farina et al. | 342/159 |
| 4,782,456 | 11/1988 | Poussier et al. | 364/574 |
| 4,791,577 | 12/1988 | Winter | 364/485 |
| 5,103,232 | 4/1992 | Chang et al. | 342/372 |
| 5,180,991 | 1/1993 | Takashima | 331/57 |
| 5,237,286 | 8/1993 | Kimura et al. | 327/69 |
| 5,243,239 | 9/1993 | Khan et al. | 327/552 |
| 5,283,532 | 2/1994 | Burkhart et al. | 329/360 |
| 5,574,369 | 11/1996 | Hibbs | 327/367 |

OTHER PUBLICATIONS

Bulsara et al, "Stochastic Resonance . . . ", Physical Review E, vol. 47, No. 5, May 1993.

P. Jung et al, "Rapid Communications", Physical Review A, vol. 46, No. 4, Aug. 1992.

(List continued on next page.)

*Primary Examiner*—Kenneth B. Wells
*Attorney, Agent, or Firm*—Harvey Fendelman; Michael A. Kagan; Peter A. Lipovsky

[57] ABSTRACT

A signal processor utilizes a globally nonlinearly coupled array of nonlinear dynamic elements. In one embodiment of the invention, these elements take the form of bistable overdamped oscillators. The processor exploits the phenomenon of stochastic resonance to amplify a weak periodic signal embedded in noise. In this signal processor, a system or plurality of nonlinearly coupled overdamped oscillators is subject to a weak periodic signal embedded in a noise background. For communication or detection applications, this weak signal component is the signal of interest. A reference oscillator is chosen from the plurality of overdamped oscillators, and is given a time scale for relaxation that is longer than the remaining oscillators. The output of the reference oscillator is analyzed for signal processing purposes in response to the signal and noise. A detailed numerical analysis of the full dynamics of the bistable element represented by the reference oscillator has shown that the signal-to-noise ratio (SNR) of the entire processor system reaches a maximum at a critical noise variance value. By using a number of overdamped oscillators working together, an enhancement of SNR can be achieved over that of the use of a single oscillator.

25 Claims, 4 Drawing Sheets

OTHER PUBLICATIONS

A. Bulsara et al., "Single Effective Neuron: Dendritic Coupling Effects and Stochastic Resonance", *Biol. Cybern.,* vol. 70, accepted Jun. 8, 1993, pp. 145–156.

P. Jung et al., "Rapid Communications", *Physical Review A,* Third Series, vol. 46, No. 14, Aug. 15, 1992, pp. R1709–R1712.

L. Kiss, "$1/f$ Noise in Systems Showing Stochastic Resonance", *Journal of Statistical Physics,* vol. 70, Nos. 1/2, Jan. 1993, pp. 451–462.

A. Bulsara, "Bifurcation and Stochastic Resonance in Coupled Neuro–Dendritic Processes", *Naval Research Reviews,* Oct. 1993, pp. 25–30.

T. Albert et al., "An Evaluation of the Stochastic Resonance Phenomenon as a Potential Tool for Signal Processing", *The Twenty–Seventh Asilomar Conference on Signals, Systems & Computers,* Feb. 1994, pp. 583–587.

A. Bulsara et al., "Coupled Neural–Dendritic Processes: Cooperative Stochastic Effects and the Analysis of Spike Trains", *Rethinking Neural Networks: Quantum Fields and Biological Data,* Sep. 1993, pp. 95–118.

R. A. Buhrman; "Noise Limitations of rf SQUIDS"; pp. 395–431; 1977; SQUID, superconducting quantum interference devices and their applications: proceedings of the International Conference on Superconducting Quantum Devices, Berlin (West), Oct. 5–8, 1976.

F. Moss; "Stochastic resonance: a signal + noise in a two state system"; pp. 649–658; May 28, 1991; *Proceedings of the 45th Annyal Symposoum on Frequency Control 1991.*

A. R. Bulsara et al.; "Noise–Induced Critical Behavior in a Multistable System"; pp. 126–150; 1987; *Physica.*

T. R. Albert et al.; "An Evaluation of the Stochastic Resonance Phenomenon as a Potential Tool for Signal Processing"; pp. 583–587; Feb. 1994; Conference Record of the Twenty–Seventh Asilomar Conference on Signals, Systems and Computers.

NOISE ASSISTED SIGNAL PROCESSOR WITH NONLINEARLY COUPLED ARRAYS OF NONLINEAR DYNAMIC ELEMENTS

This application is a continuation of application Ser. No. 08/662,811, field Jun. 12, 1996, now abandoned, which is a continuation of application Ser. No. 08/249,111, filed May 25, 1994, now abandoned.

BACKGROUND OF THE INVENTION

The following document is hereby incorporated by reference into this specification: Bulsara, A. R. and G. Schmera, May 1993, "Stochastic Resonance in Globally Coupled Nonlinear Oscillators", Physical Review E, Vol. 47, no. 5, pp. 3734–3737.

This invention pertains broadly to the field of signal processing. More particularly, the invention pertains to a signal processor that exploits noise to amplify a signal of interest. In greater particularity, but without limitation thereto, the signal processor of the invention utilizes the phenomenon of stochastic resonance in a nonlinear dynamic system to transfer power from a noise background to a signal of interest.

Traditional signal processing has relied on various combinations of linear filters, including numerical techniques such as the Fast Fourier Transform (FFT), that are realizable in both hardware and software. Though the FFT is applicable to signals of any frequency, its use requires significant computation.

Hardware filters or processors for very low frequencies can be difficult to design. Such filters are, typically, tuned inductor-capacitor resistor (LCR) circuits, the resonant frequency of which is changed by capacitor and inductor adjustment. For very low frequencies, practical limitations exist on the magnitudes of the circuit inductance and capacitance one can realize while still producing a high quality circuit.

Software filters have been developed to overcome the deficiencies of many analog filters, but implementing software filters can require complex hardware and have significant computational requirements.

In the above-described conventional signal processing methods, noise, whether created naturally or intentionally, is usually considered a disruption or a hindrance to communication. This noise is usually eliminated or substantially reduced through filtering. In fact, ever since the advent of telephone and radio, engineers have devoted tremendous efforts to eliminating or minimizing the effects of noise. As a result, an entire discipline known as linear filter theory has evolved and has become standard teaching to electrical engineering and/or communication students.

In the cognitive and neural science areas, a nonlinear filtering process known as stochastic resonance (SR) has been investigated. To those schooled in linear doctrine, filtering with SR begins with a radical premise: that noise, either inherent or generated externally, can be used to enhance the flow of information through certain nonlinear systems.

Stochastic resonance is a nonlinear stochastic phenomenon which can effectively cause a transfer of energy from a random process (noise) to a periodic signal over a certain range of signal and system parameters. It has been observed in natural and physical systems and may be one means by which biological sensor systems amplify weak sensory signals for detection.

Stochastic resonance has actually been demonstrated in a variety of physical experiments ranging from ring lasers to a number of solid state devices including SQUIDs (superconducting quantum interference devices) and tunnel diodes.

Peter Jung, Ulrich Behn, Eleni Pantazelou and Frank Moss have proposed that in a network consisting of an infinite number of linearly coupled bistable oscillators with linear mean-field interaction, the stochastic resonance effect is enhanced over what would be expected for a single isolated element of the network. In examining output signal only, the theory proposed is confined to the bifurcation point of the effective bistable potential that describes the network dynamics (in the large N limit) and appears inapplicable away from the bifuraction critical point. In this linear coupling theory, the strength and signs of all coupling coefficients must be the same.

SUMMARY OF THE INVENTION

The invention is a signal processor utilizing a globally nonlinearly coupled array of nonlinear dynamic bistable elements. These elements can take the form of overdamped oscillators, "overdamped" in this sense meaning that the oscillators essentially possess no second time derivative in their dynamics. The processor exploits the phenomenon of stochastic resonance to amplify a weak periodic signal embedded in noise. The processor is applicable beyond critical bifurcation points of a bistable potential, and can be used as a way of enhancing the output signal-to-noise ratio (SNR) over its value for a single bistable element. It can be used with as few as two bistable elements, and can be optimized through the adjustment of system parameters.

In a preferred embodiment of the invention, a system or plurality of nonlinearly coupled overdamped nonlinear oscillators is subject to a weak periodic signal embedded in a noise background. For communication or detection applications, this weak signal component is the signal of interest. A reference oscillator is chosen from the plurality of oscillators, and is given a time scale for relaxation that is longer than the remaining oscillators. The output of the reference oscillator is analyzed for signal processing purposes in response to the signal and noise.

A detailed numerical analysis of the full dynamics of the bistable element represented by the overdamped reference oscillator has shown that the SNR of the entire processor system is maxmized when noise reaches a critical value. By coupling a number of overdamped oscillators together, an enhancement of SNR can be achieved over the use of a single oscillator.

OBJECTS OF THE INVENTION

It is an object of this invention to provide a signal processor that is an improvement over hardware or software linear filters including linear filtering techniques such as the Fast Fourier Transform.

Another object of this invention is to provide a signal processor in which noise is a feature to be utilized rather than to be suppressed.

Still a further object of this invention is to provide a signal processor that utilizes the phenomenon of stochastic resonance to enhance the detection or other processing of a signal of interest.

Other objects, advantages and new features of the invention will become apparent from the following detailed description of the invention when considered in conjunction with the accompanying drawings.

DESCRIPTION OF THE PREFERRED EMBODIMENT

A plurality of nonlinearly coupled, nonlinear dynamic elements subject to a weak periodic signal embedded in noise can be described by the system:

$$C_i \dot{u}_i = \sum_{j=1}^{N} J_{ij} \tanh u_j - \frac{u_i}{R_i} + F(t) + q\sin\omega t \qquad (1)$$

In Equation (1) it is assumed that each element of this system is subject to Gaussian delta-correlated noise having zero mean and variance D. It should be noted, however, that the noise is not restricted to be Gaussian or delta-correlated but could be other forms of noise as well.

Figures 1, 1A, 1B:
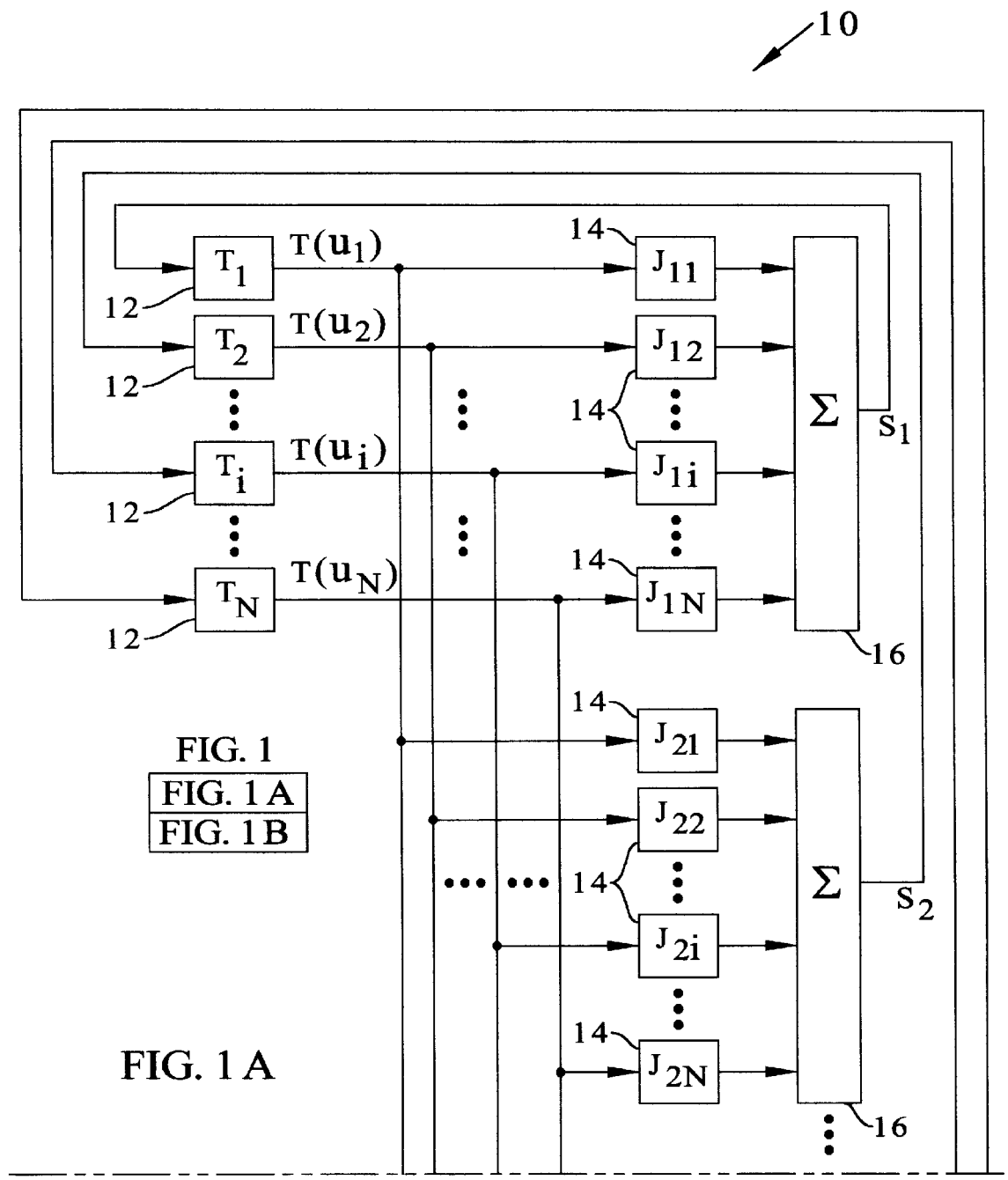
FIGS. 1A and 1B is an analog representation of a plurality of globally nonlinearly coupled, nonlinear overdamped oscillators.
Figure 1B:
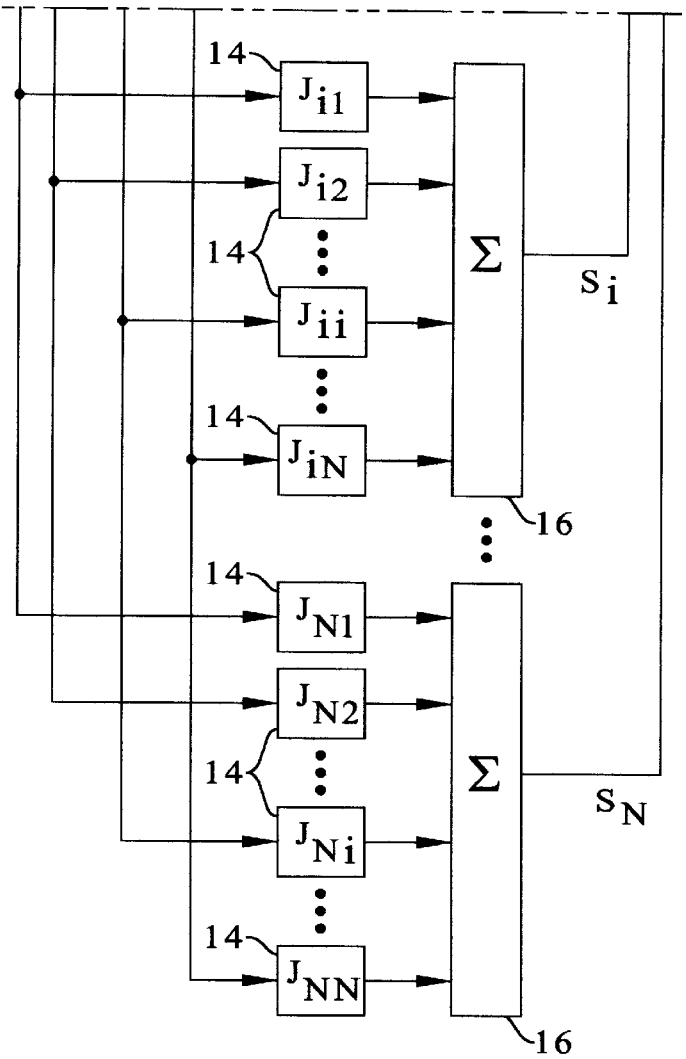

In one embodiment of the invention, the nonlinear dynamic elements are nonlinear overdamped oscillators to be described in greater detail. The index i=1 is taken to denote a reference element/oscillator and the indices i=2, . . . N denote the remaining plurality of elements/oscillators. $C_i$ and $R_i$ denote the input capacitance and resistance of the oscillator with index i. The term $u_i$ denotes an activation or forcing function input that may take any of a number of forms, e.g. voltage, sound intensity, light intensity, magnetic flux. The term J is a coupling coefficient to be discussed. The hyperbolic tangent (tanh) is a nonlinear coupling function. The hyperbolic tangent of $u_i$ is computed to produce a nonlinear element coupling. It should be noted that other nonlinear coupling functions such as trigonometric functions, other hyperbolic functions and powers can also be used. The term F(t) is noise and q sinωt is a weak periodic signal in which q is the amplitude of the signal and ω is the frequency of the signal. FIGS. 1A and 1B show a block diagram of how a system described by equation (1) can be realized in analog circuitry.

In FIGS. 1A and 1B, a signal processor 10 is shown incorporating a representative plurality (N) of nonlinear bistable overdamped oscillators 12. Each oscillator 12 is globally connected to every other oscillator 12 within processor 10. What is meant by "globally connected" is that each oscillator feeds/interacts with every other oscillator or, put another way, each oscillator receives an output derived from every other oscillator. Each oscillator 12 is also connected to receive and output derived from itself.

In FIGS. 1A and 1B the blocks containing "J" are "coupling coefficients" that are the result of a chosen function the preferred form to be discussed. These coupling coefficients, designated as 14 in FIGS. 1A and 1B, are shown with a first digit indicating the coefficient's destination oscillator and a second digit indicating its source oscillator. For example, $J_{ij}$ has an output going to destination oscillator $T_i$ and has an input received from source oscillator $T_j$.

The summers 16, indicated symbolically with a sigma, each serve to sum those oscillator outputs, appropriately multiplied by (adjusted by) coupling coefficients 14, desired to be input back to a particular oscillator 12. For example, output summation $S_1$ is the sum of all oscillator 12 outputs T(u) as multiplied by coefficients $J_{11}$ . . . $J_{1N}$. Similarly, summation $S_2$ is the summation of all oscillator 12 outputs T(u) times coefficients $J_{21}$ . . . $J_{2N}$. The summation output is shown by the equation $$S_i = \sum_{j=1}^{N} J_{ij} T(u_j).$$

According to the invention, the output of the "reference" oscillator, $u_1(t)$, of the plurality of overdamped oscillators, is measured in response to the signal (q sinωt) and noise (F(t)). For communication or detection applications, the signal component q sinωt is the signal of interest.

Figure 2:
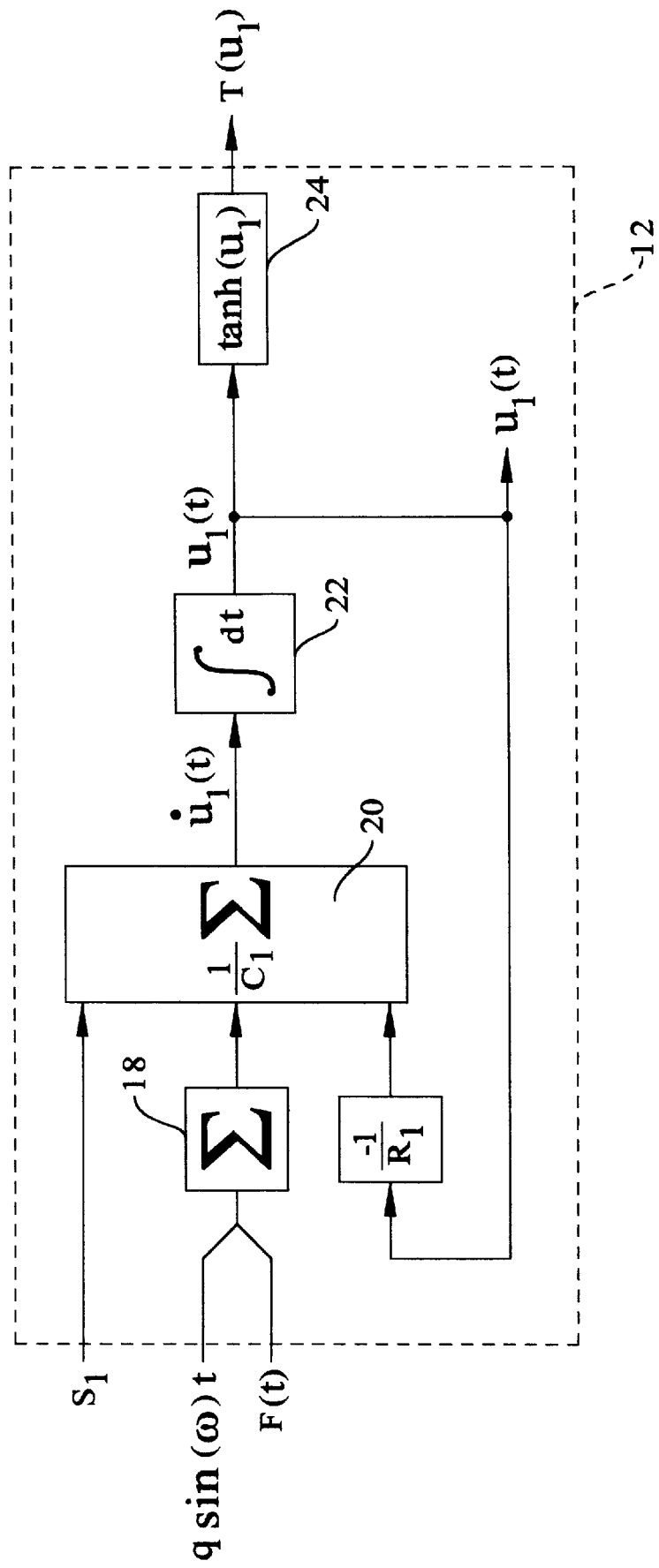
FIG. 2 is a detailed view of a single nonlinear oscillator as may be used in the invention shown in FIG. 1A.

In FIG. 2 a representative oscillator is shown. This oscillator is identified as $T_1$, which, in this description of the invention, is the oscillator chosen as a reference oscillator. It should be understood that the reference oscillator could be any of the overdamped oscillators described by equation (1) or shown in FIGS. 1A and 1B. As with all the oscillators 12 of FIGS. 1A and 1B, a "coupling summation" input, in this case $S_1$, will be input to the oscillator. In addition, each oscillator will have two additional inputs, the noise input F(t) and the weak periodic source signal (q sinωt), see FIG. 2. It should be noted that what is meant by weak in this case is that q is small compared to F (the intensity of F). The input signal to noise ratio (SNR) referenced to noise power in the frequency range Δv is defined as:

$$SNR = \frac{\frac{1}{2}q^2}{2D\Delta v}$$

where D equals the variance of noise F and q is the amplitude of the "weak" periodic signal. The noise source F(t) and the weak periodic signal source q sinωt are summed in summer 18 and are then combined with coupling summation $S_1$, shown in equation form as $$\dot{u}_1(t) = \frac{1}{C_i}S_i - \frac{u_i(t)}{R_iC_i} + \frac{F(t)}{C_i} + \frac{q}{C_i}\sin(\omega t)$$

and $-1/R_1$ in a summer 20. This sum is then multiplied by $1/C_1$. Again, $R_1$ and $C_1$ in this instance equal the capacitance and resistance, respectively, of the oscillator having the index i=1. The output of summer 20, shown in equation form as $$S_i = \sum_{j=1}^{N} J_{ij} T(u_j) = \sum_{j=1}^{N} J_{ij} \tanh(u_j)$$

is then integrated in integrator 22. Oscillator output signal $u_1(t)$, from integrator 22, is in turn processed by nonlinear coupling function 24 shown here as the hyperbolic tangent (tanh ($u_1$)). This nonlinear coupling function 24 computes a nonlinear function of integrator 22 output $u_1(t)$. As mentioned earlier, other nonlinear coupling functions could be used, such as trigonometric functions, other hyperbolic functions as well as powers, etc. It should be noted that the nonlinear term does not need to be incorporated within oscillator element 12 but could be utilized as a separate element. Nonlinear output signal $T(u_1)$ is then forwarded to the appropriate coupling coefficients 14 shown in FIGS. 1A and 1B.

Oscillator output signal $u_1(t)$ is an oscillator output taken immediately after integrator 22 and before the nonlinear coupling term is applied. This output signal, in one use of the invention, can be analyzed for communication or detection purposes.

According to a preferred embodiment of the invention, the time scale for relaxation of the reference oscillator should be made longer than the rest of the overdamped oscillators to which it is connected:

$$C_i R_i < C_1 R_1 (i>1). \tag{2}$$

From the oscillator system described in Equation (1), the dynamics of the reference oscillator that is characterized by state variable $u_1(T)$ can be extracted and cast in the form:

$$\dot{u}_1(t) = \dot{u}_1 = -\alpha u_1 + \beta \tanh u_1 + \delta \sin \omega t + \sqrt{D_e} F(t) \tag{3}$$

where, $$\alpha = (R_1 C_1)^{-1}; \quad \beta = C_1^{-1}\left[J_{11} + \sum_{i>1} R_i G_i^{-1} J_{1i} J_{i1}\left(1 - \frac{DR_i}{2C_i}\right)\right]; \tag{4}$$

$$\delta = \frac{q}{C_1}\left[1 + \sum_{i>1} R_i G_i^{-1} J_{i1}\left(1 - \frac{DR_i}{2C_i}\right)\right];$$

$$G_i \equiv 1 - J_{ii} R_i; \quad D_e \equiv D/C_1$$

and F(t) is, in this preferred embodiment, now Gaussian delta-correlated noise having zero mean and unit variance. Equation (3) represents a one-variable nonlinear dynamic system describable by a "potential function"

$$U(u_1) = \frac{\alpha}{2} u_1^2 - \beta \ln \cosh u_1 \tag{5}$$

which has turning points at $u_1=0$ and $u_1=\pm c \approx \beta/\alpha \tanh(\beta/\alpha)$. If one numerically integrates (3) and computes the power spectral density $S(\Omega)$ of the solution $u_1(t)$, and the signal-to-noise ratio (SNR), it will be observed that the SNR reaches a maximum as the noise variance $D_e$ reaches a critical value $D_c$. Typically, one obtains $D_c \approx U_0 \equiv U(0) - U(c)$, the height of the potential barrier.

Figure 3:
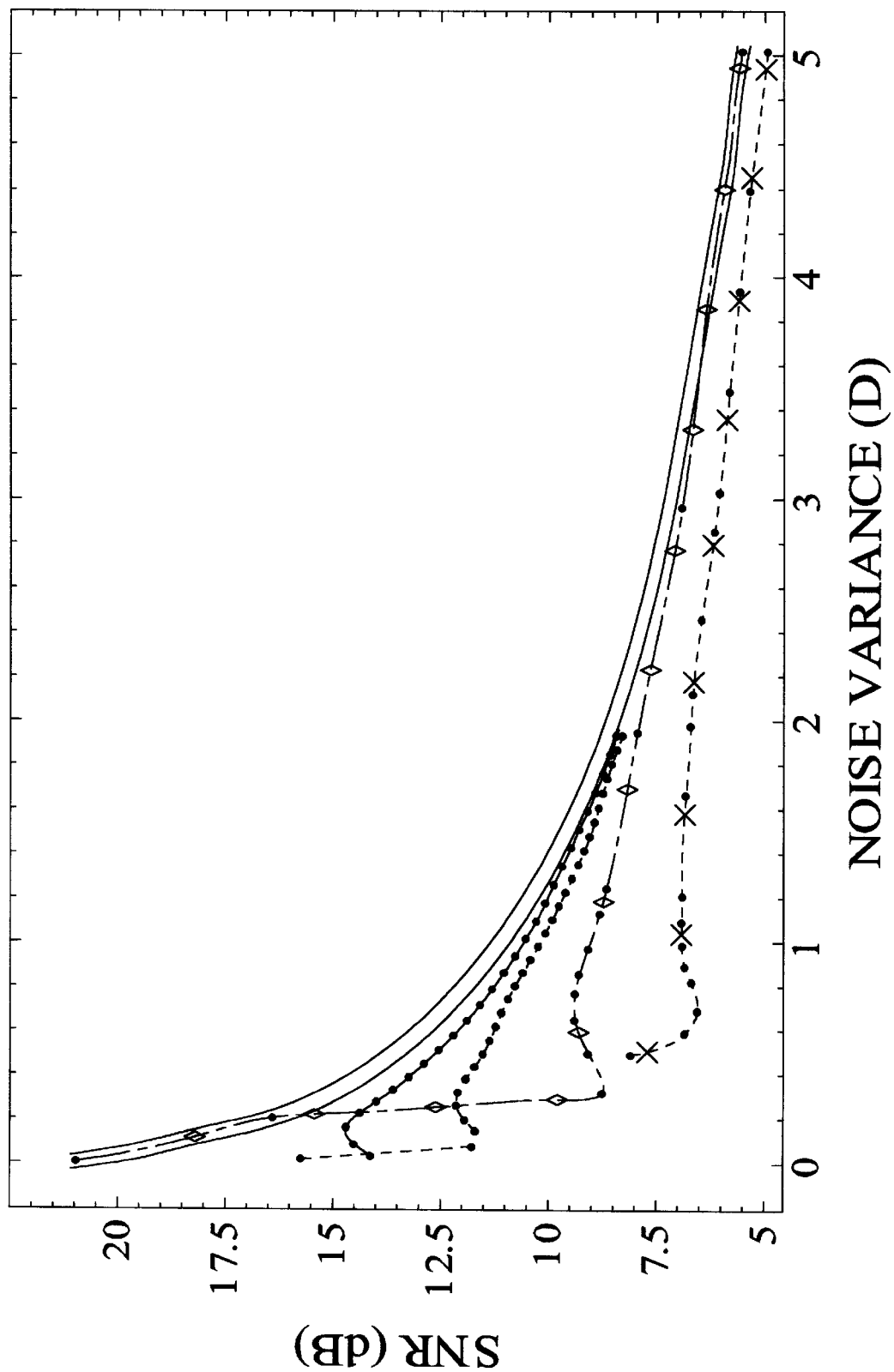
FIG. 3 graphically shows the increase in SNR through the use of multiple coupled oscillators as compared to the use of a single oscillator.

By utilizing a plurality of nonlinearly coupled nonlinear overdamped oscillators it is possible to enhance the SNR over what would be observed for a single (isolated) oscillator case. Referring to FIG. 3, the enhancement of SNR by using multiple nonlinearly coupled bistable overdamped oscillators can be seen.

In this figure, the double thin line curve shows input SNR. The remaining curves show theoretical predictions for output SNR, for one oscillator element (dashed-exed), and two (dashed-diamond), three (dashed-dotted), and four (connected dots) coupled oscillator elements. Data points (shown as dots) give results of numerical simulations. System parameters are:

$\omega=0.1, q=0.1, R_1=1, C_1=1, J_{11}=2.5, R_i=0.1, C_i=1, J_{ii}=1, J_{12}=2, J_{13}=2.1, J_{14}=1.9, J_{i1}=-1, i>1$ (For FIG. 3, the width of each FFT bin is 0.00015955 Hertz, and the FFT processing gain, using a Welch windowing function, is 0.8333).

From FIG. 3 it is easy to see that the signal-to-noise ratio reaches a maximum at a particular noise variance value D and that this effect is enhanced through the use of multiple coupled overdamped oscillators.

The invention exploits the nonlinear dynamic characteristics of a system such as that described by Equation (1). A number of specific advantages of this invention are worth indicating. Though the system of the invention may be used to detect and process signals at almost any frequency, it works extremely well at low frequencies. The only requirement for optimization of the invention in this regard is that the characteristic noise-induced hopping frequency of the processor (Kramers frequency $r_0$) be comparable to the modulation frequency ($\omega$) such as by a factor of 2 and that the noise be white over a bandwidth at least two orders of magnitude greater than the modulation frequency. To optimize the detection process for a given input frequency, the system parameters should be adjusted such that the Kramers rate $r_0$ is of the same order of magnitude as the signal frequency $\omega$ for the composite system (3). However, the stochastic resonance effect is obtained even when $r_0$ and $\omega$ differ by several orders of magnitude. Here, $r_0$ is given by:

$$r_0 = \frac{1}{2\pi}[|U^{(2)}(0)|U^{(2)}(c)]^{1/2} \exp(-2U_0/D_e) \tag{6}$$

where $U_0$ is the potential barrier height defined above, and we define $U^{(2)}(0) \equiv [d^2U/du_1^2]_{u_1=0}$ and $U^{(2)}(c) \equiv [d^2U/du_1^2]_{u_1=c}$ where c is the location of the rightmost minimum of the effective potential (5). Note that $r_0$ is adjustable by changing system and noise parameters. It is independent of $\omega$.

A further advantage of the signal processor of the invention is that, noise, whether arising inherently or superimposed on the signal itself, can actually be used to enhance signal detection. In fact, for extremely weak signals, injecting carefully controlled amounts of noise into the system can actually enhance the system's signal-to-noise ratio output. This effect does not occur in conventional signal processing.

Finally, it has been realized that by nonlinearly coupling large numbers of nonlinear circuit elements, constrained, for example, by Equation (2), larger output signal-to-noise ratios will be possible than with a single (isolated) oscillator. Ultimately, for large numbers of coupled elements subject to the constraint (2), the output SNR approaches (even at low noise) the input SNR. The system of the invention thus performs like an "optimal" linear system.

For the special case in which all the oscillator resistors $R_i$ are set the same, the system output SNR becomes nearly equal to the input SNR. This effect can be realized even with as few as two coupled overdamped oscillators. For this case, however, a theoretical characterization of the form of equation (3) is not known to exist.

Superior results appear to be obtainable for coupling coefficients J subject to the conditions:

(i) $J_{11} > (R_1 C_1)^{-1} > 0$ . . . this ensures bistability in the composite dynamics (3) and (ii) $J_{1i} > 0, J_{i1} < 0$ with $|J_{1i}|, |J_{i1}| < J_{11}$.

An estimate of the output SNR referenced to noise power in the angular frequency range $\Delta\omega$ may be obtained using the approximate expression $$SNR = 10\log\left[\frac{1}{N_0}\left\{\frac{S_0}{\Delta\omega} + N_0\right\}\right]. \tag{7}$$

The other quantities in (7) are defined as:

$$N_0 = [1 - 8Z(r_0\zeta)^2](8Zr_0c^2) \tag{8a}$$

$$S_0 = 16Z\pi(r_0\zeta c)^2 \tag{8b}$$

where we define $Z=(4r_0^2+\omega^2)_{-1}$ and $\zeta=\delta c/D_e$ is a perturbation theory expansion parameter. This expression may be used to approximately calculate the output SNR for a given set of coupling coefficients and compare it to the input SNR. Hence, it serves as a guide to the best selection of the coupling coefficients.

To use the invention as a signal processor/detector, one would first make a determination of a band of frequencies and a range of amplitudes (q) in which a signal of interest ($\omega$) would fall. Further, the noise intensity background (F(t)) should be surmised. The capacitance terms, resistance terms and the coupling coefficients (J) of Equation (1) would then be chosen. In particular, the capacitance, resistance and coupling term J of the reference and remaining overdamped oscillators would be chosen so that a peak in signal-to-noise ratio, such as determined through equation (7), is achieved close to the frequency of interest. The nonlinear function of Equation (1) could, of course, be changed; however, the hyperbolic tangent has been chosen as this function closely resembles that of biological systems thought to employ stochastic resonance efficiently.

Obviously, many modifications and variations of the invention are possible in light of the above teachings. It is therefore to be understood that within the scope of the appended claims the invention may be practiced otherwise than as has been specifically described.

What is claimed is:

1. A stochastic resonance signal processing method for providing an increase in output signal-to-noise ratio compared to the output signal-to-noise ratio of a single stochastically resonated nonlinear dynamic element comprising tile steps of:

nonlinearly coupling a plurality of nonlinear dynamic elements in which each of said nonlinear dynamic elements has an output signal and an associated nonlinear output signal obtained by taking a nonlinear function of said output signal, said step of nonlinearly coupling including inputting to each of said nonlinear dynamic elements a respective summed signal derived from all of said nonlinear output signals; and applying a signal of interest and noise to each nonlinear dynamic element to establish stochastic resonance amongst said nonlinear dynamic elements to produce an output signal-to-noise ratio corresponding to a selected one of said output signals that is increased compared to said output signal-to-noise ratio of said single stochastically resonated nonlinear dynamic element.

2. The method according to claim 1 in which each nonlinear dynamic element comprises a nonlinear overdamped oscillator.

3. The method according to claim 2 in which each of said nonlinear overdamped oscillators is characterized in part by a resistance and capacitance value that is selectable to optimize said output, signal-to-noise ratio corresponding to said selected one of said output signals.

4. The method according to claim 3 in which said signal of interest comprises a periodic signal.

5. The method according to claim 4 in which said noise comprises delta correlated Gaussian noise.

6. The method according to claim 5 in which said noise comprises background noise.

7. The method according to claim 6 in which said noise comprises background noise and additional noise.

8. The method according to claim 1 in which said nonlinear dynamic elements are bistable.

9. The method according to claim 2 in which said nonlinear function is a hyperbolic function.

10. The method according to claim 9 in which said hyperbolic function is the hyperbolic tangent.

11. The method according to claim 2 in which said nonlinear function is a trigonometric function.

12. The method according to claim 2 in which said nonlinear function is a power.

13. The method according to claim 1 wherein said respective summed signal that is input to each of said nonlinear dynamic elements is adjusted by multiplying each of said nonlinear output signals by a respective coupling coefficient that corresponds to the nonlinear dynamic element which said nonlinear output signal comes from and to which said respective summed signal goes, said coupling coefficients being selectable to optimize said output signal-to-noise ratio corresponding to said selected one of said output signals.

14. The method according to claim 8 in which said nonlinear function is a hyperbolic function.

15. The method according to claim 8 in which said nonlinear function is a trigonometric function.

16. The method according to claim 8 in which said nonlinear function is a power.

17. The method according to claim 2 in which each of said nonlinear overdamped oscillators has a time scale for relaxation and in which said selected one of said output signals corresponds to a selected one of said nonlinear overdamped oscillators, said selected one of said nonlinear overdamped oscillators having a time scale for relaxation that is greater than the time scale for relaxation of each of the remaining nonlinear overdamped oscillators.

18. The method according to claim 17 in which said signal of interest comprises a periodic signal.

19. The method according to claim 18 in which said noise comprises delta correlated Gaussian noise.

20. The method according to claim 19 in which said noise comprises background noise.

21. The method according to claim 20 in which said noise comprises background noise and additional noise.

22. The method according to claim 17 in which each of said nonlinear overdamped oscillators is characterized in part by a resistance and capacitance value and wherein a product of the resistance and capacitance value of said selected one of said nonlinear overdamped oscillators is greater than a product of the resistance and capacitance value of any of the remaining nonlinear dynamic elements.

23. The method according to claim 17 in which said nonlinear function is a hyperbolic function.

24. The method according to claim 17 in which said nonlinear function is a trigonometric function.

25. The method according to claim 17 in which said nonlinear function is a power.

* * * * *